(12) United States Patent
Wartnick et al.

(10) Patent No.: US 9,678,965 B1
(45) Date of Patent: Jun. 13, 2017

(54) SYSTEM AND METHOD FOR ENFORCING DATA LIFECYCLE POLICY ACROSS MULTIPLE DOMAINS

(75) Inventors: Jeremy Howard Wartnick, Minnetonka, MN (US); Jeremy Dean Swift, Plymouth, MN (US)

(73) Assignee: Veritas Technologies LLC, Mountain View, CA (US)

( * ) Notice: Subject to any disclaimer, the term of this patent is extended or adjusted under 35 U.S.C. 154(b) by 1291 days.

(21) Appl. No.: 12/494,014

(22) Filed: Jun. 29, 2009

(51) Int. Cl.
*G06F 17/30* (2006.01)

(52) U.S. Cl.
CPC .............................. *G06F 17/30085* (2013.01)

(58) Field of Classification Search
CPC ................................................. G06F 17/30085
USPC ........ 707/640, 652, 653, 654, 662, 663, 665
See application file for complete search history.

(56) References Cited

U.S. PATENT DOCUMENTS

| | | | |
|---|---|---|---|
| 7,007,048 B1 | 2/2006 | Murray et al. | |
| 7,552,358 B1* | 6/2009 | Asgar-Deen et al. | 714/6.1 |
| 2004/0249865 A1* | 12/2004 | Lee et al. | 707/200 |
| 2005/0021524 A1 | 1/2005 | Oliver | |
| 2005/0132257 A1* | 6/2005 | Gold et al. | 714/47 |
| 2005/0177777 A1* | 8/2005 | Seaburg et al. | 714/42 |
| 2006/0259901 A1 | 11/2006 | Kaplan | |
| 2007/0005669 A1* | 1/2007 | Mueller et al. | 707/204 |
| 2007/0294321 A1* | 12/2007 | Midgley et al. | 707/204 |
| 2008/0120465 A1 | 5/2008 | Brannon et al. | |
| 2008/0235755 A1* | 9/2008 | Blaisdell et al. | 726/1 |
| 2008/0256110 A1* | 10/2008 | Sen et al. | 707/102 |
| 2008/0270413 A1* | 10/2008 | Gavrilov et al. | 707/10 |
| 2008/0307527 A1* | 12/2008 | Kaczmarski et al. | 726/24 |
| 2009/0125577 A1* | 5/2009 | Kodama et al. | 709/201 |

OTHER PUBLICATIONS

Davies, Veritas NetBackup Tm 6.5: Designing and Implementing Backups Using Storage Lifecycle Policies, Nov. 2007, pp. 1-35.*
Microsoft Computer Dictionary, 5th Edition, 2002, p. 338.*
"Information Lifecycle Management," Wikipedia, http://en.wikipedia.org/wiki/Information_lifecycle_management, retrieved May 12, 2011, 4 pages.
Damianou, N., Dulay, N., Lupu, E., Sloman, M., and Tonouchi, T., "Tools for Domain-Based Policy Management ofDistributed Systems," IEEE/IFIP Network Operations and Management Symposium (NOMS2002), 2002, 15 pages.

(Continued)

*Primary Examiner* — Albert Phillips, III
(74) *Attorney, Agent, or Firm* — Meyertons, Hood, Kivlin, Kowert & Goetzel, P.C.

(57) ABSTRACT

A first backup storage system within a receiving domain receives information from an originating domain distinct from the receiving domain. The first backup storage system includes at least one storage device and the information includes backup data and corresponding lifecycle policy information for the backup data. The first backup storage system automatically performs an operation relating to the backup data, where the operation is specified by the received lifecycle policy information. In some embodiments, the lifecycle policy information may be received by the receiving domain within a header located within the backup data.

20 Claims, 7 Drawing Sheets

(56) References Cited

OTHER PUBLICATIONS

Arun Jagatheesan, "The GGF Grid File System Architecture Workbook," Global Grid Forum, GWD-I: GGF Grid File System Working Group, San Diego Supercomputer Center, Version 1.0, Apr. 2005, 17 pages.

Akshat Verma, Upendra Sharma, Rubas, J., Pease, D., Kaplan, M., Rohit Jain, Murthy Devarakonda, Beigi, M., "An architecture for lifecycle management in very large file systems," Proceedings of the 22nd IEEE / 13th NASA Goddard Conference on Mass Storage Systems and Technologies (MSST'05), Apr. 2005, 9 pages.

* cited by examiner

SYSTEM AND METHOD FOR ENFORCING DATA LIFECYCLE POLICY ACROSS MULTIPLE DOMAINS

BACKGROUND

Technical Field

This disclosure relates generally to backup storage systems and, more specifically, to the use of lifecycle policy information for backup images.

Description of the Related Art

In many organizations, computing systems and networks often contain valued information that the organization may wish to preserve and protect. For example, a business organization may desire to store customer records and/or orders in a safe manner that is resilient to system failures.

A common technique for securing valuable data is to perform a backup of the data. Organizations have traditionally deployed various automated data backup products, such as Symantec Corporation's NetBackup™ software. Such products may protect valuable data, such as a group of files, by creating a backup image of the data and storing a copy of that image on one or more redundant storage resources, such as one or more backup servers. In some cases, a backup image may be created and moved to a backup location manually by a system administrator. In some cases, the backup image may include the backup data (which may be compressed) and some header information that allows a receiving server to reconstitute the backed up data (e.g., file names, directory structure, compression techniques applied, etc.) Thus, if the original data is lost, the backup image may be retrieved and restored. Such loss and restoration of data may sometimes be referred to as disaster recovery.

Backup servers sometimes manage backup images according to various storage policies. These policies may be stored in a domain-local backup catalog (i.e., database) and may be associated with each backup image. When a backup image is transferred to a domain that does not have access to the original backup catalog (e.g., a disaster recovery domain), implementation of these storage policies is problematic absent intervention by a system administrator of the new domain.

SUMMARY

In one embodiment, a method includes a first backup storage system within a receiving domain receiving information from an originating domain distinct from the receiving domain, where the first backup storage system includes at least one storage device. The received information includes backup data and corresponding lifecycle policy information for the backup data. The method further includes the first backup storage system automatically performing an operation relating to the backup data, wherein the operation is specified by the received lifecycle policy information.

In some embodiments, the receiving domain may comprise a disaster recovery domain, the backup data may be generated by a second backup storage system within the originating domain, the originating domain may include a backup catalog corresponding to the backup data, and the backup catalog may not be accessible from within the receiving domain.

In some embodiments, the lifecycle policy information may be received by the receiving domain within a header located within the backup data.

In some embodiments, the backup data may have been created by a first backup operation of a set of data, and the lifecycle policy information may include information pertaining to a second backup operation performed on the set of data prior in time to the first backup operation.

In some embodiments, the lifecycle policy information may specify a duration that the backup data is to be maintained by the receiving domain.

In some embodiments, the lifecycle policy information may specify that the backup data is to be propagated to a tertiary domain distinct from the originating and receiving domains. In some such embodiments, the lifecycle policy information may include information instructing the receiving domain to provide information to the tertiary domain that specifies one or more operations to be performed on the backup data by the tertiary domain. In some embodiments, the lifecycle policy information may include a custom tag specifying a priority level for the backup data, and a manner in which the operation is performed may be based, at least in part, on a value of the custom tag.

In some embodiments, the lifecycle policy information may include information specifying a notification condition and an entity, and said automatically performing may include automatically determining that the notification condition is satisfied and in response, automatically notifying the entity that the notification condition has been satisfied. In some embodiments, the entity may be associated with the originating domain.

In one embodiment, an article of manufacture is disclosed that includes a computer-readable medium having instructions stored thereon that, if executed by a backup storage system within a first domain, may cause the backup storage system to perform a method. The method includes receiving information from a second domain distinct from the first domain, where the information may include a backup image that may include backup data and corresponding lifecycle policy information for the backup image. The method further includes automatically performing an operation on the backup image, where the operation may be specified by the received lifecycle policy information.

In some embodiments, the lifecycle policy information may include an identification of the second domain. In some embodiments, the lifecycle policy information may specify a replacement policy for the backup image within the first domain.

In some embodiments, the method may further comprise automatically sending a message outside the first domain, where the message may include information indicating a status of the operation on the backup image.

In some embodiments, the lifecycle policy information may include provenance information pertaining to the backup image and further includes information specifying a retention policy for the backup image within the first domain. In some embodiments, the operation may include moving the backup image to a different backup storage system.

In one embodiment, a system is disclosed that includes a storage system in a first domain, where the storage system includes at least one storage device, one or more processors. The system further includes a memory storing program instructions executable by the one or more processors to receive information from a second domain distinct from the first domain, where the received information includes a backup image that includes backup data and corresponding lifecycle policy information. The instructions may further be executable to automatically cause an operation to be performed on the backup image, where the operation is specified by the lifecycle policy information. In some embodiments, the lifecycle information may include provenance information for the backup image, and a catalog for the backup image in the second domain may be inaccessible by the system.

In some embodiments, the lifecycle policy information specifies a condition under which the backup image may be deleted, and the program instructions may be executable to automatically cause the storage system to perform the operation based at least in part on automatically detecting the specified condition.

In some embodiments, the lifecycle policy information includes information relating to one or more previous backups of the set of data, and the lifecycle policy information may include information specifying future handling of the backup image within the first domain.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present disclosure, including as defined by the appended claims. It is noted that the word "may" is used throughout this application in a permissive sense (i.e., having the potential to, being able to), not a mandatory sense (i.e., must).

DETAILED DESCRIPTION

Organizations often secure valuable data by creating a backup image of the data and storing the image in a backup system. A variety of lifecycle policies may be applied by the backup system when handling the image. Such policies may specify when/if a given image should be deleted, how to handle the image when new images are received (e.g., delete, archive, etc), and/or any number of other instructions for handling the image. Lifecycle policy information is commonly recorded in a backup catalog or database that stores policies for data backed up in a respective domain. As used herein, a domain is defined by the scope of a backup catalog and/or other lifecycle policy enforcement mechanism. That is, a backup catalog and/or other lifecycle policy enforcement mechanism may enforce various lifecycle policies on data items residing in a respective domain. However, if a data item is moved to another domain, which may be managed by a different catalog and/or enforcement mechanism, the original backup catalog and/or enforcement mechanism may no longer have access to the moved data item since the data is in a remote domain and being managed by a different backup catalog and/or lifecycle policy enforcement mechanism.

Backup images are sometimes moved or copied between domains. For example, a system administrator in a first domain may choose to copy a backup image onto a physical storage medium and ship it to a geographically remote data center (a second domain) for backup. In an automated example, a storage system in one domain may determine that a copy of a given backup image should be propagated to another domain and copy the image to a storage system in another domain. Since each domain may enforce lifecycle policy information according to its own local backup catalog, lifecycle policy information is traditionally lost when transferring backup images between distinct domains.

As described herein in various embodiments, lifecycle policy information may be integrated into or included along with the backup image. For example, in one embodiment, lifecycle policy information for a given backup image may be embedded in the image. In another embodiment, lifecycle policy information may be stored in a file that is associated with the backup image. In either case, when the backup image is moved from one domain to another, the lifecycle policy information may be transferred as well, allowing any policies set forth in this information to be maintained and therefore applied to different copies of the image consistently across multiple domains.

Figure 1:
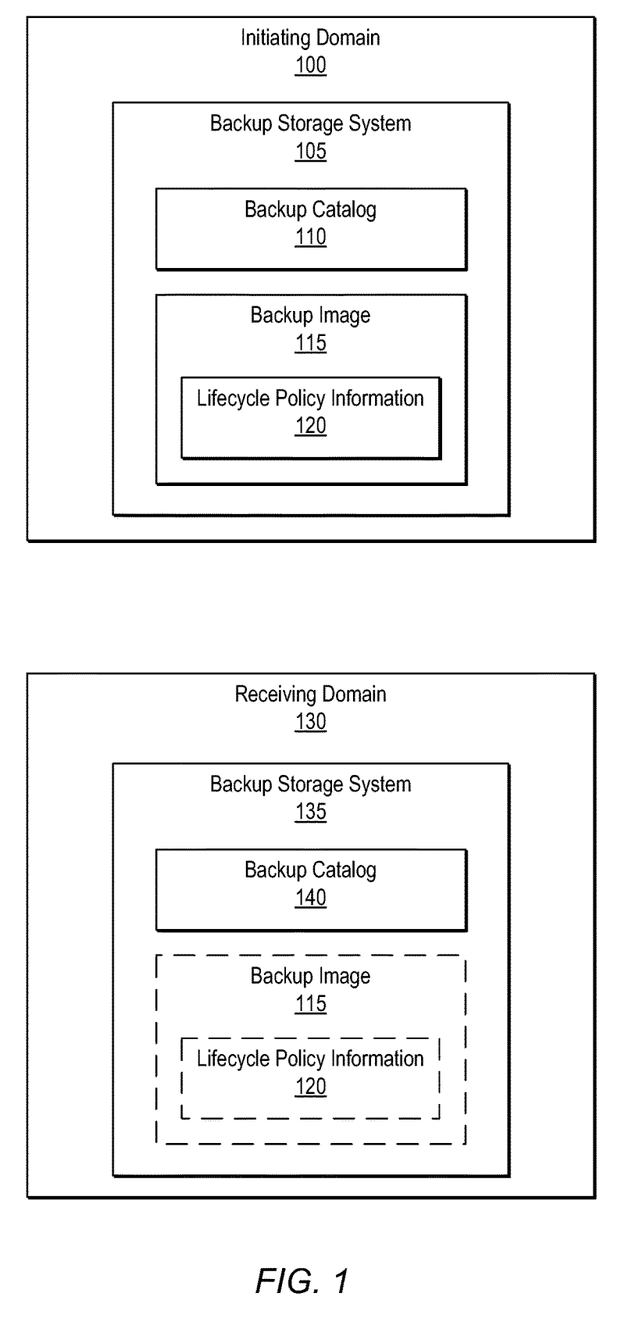
FIG. 1 is a block diagram illustrating one embodiment of a backup system in a first domain that is configured to store and transmit a backup image and lifecycle policy information to a backup system in another domain.

FIG. 1 illustrates one embodiment of a system with two domains. In the illustrated embodiment, initiating domain 100 comprises a backup storage system 105. Backup storage system 105 may comprise one or more computer and/or storage systems configured to store backup data. For example, in one embodiment, backup storage system 105 may comprise a data center wherein an organization's backup data is stored and/or may be provided as part of a cloud computing platform. (As used herein, "backup data" refers to the product of a backup of some set of data. In various embodiments as described herein, backup data may or may not include lifecycle policy information. In certain embodiments, such policy information may be included in a header within the backup data; in other embodiments, such policy information may be stored in a file or location separate from, but associated with the backup data.)

In the illustrated embodiment, backup storage system 105 comprises backup catalog 110 and a backup image 115. Backup catalog 110 may store lifecycle policy information for each backup image stored on the system, such as backup image 115. For example, backup catalog 110 may store and associate lifecycle policy information with backup image 115 that specifies that backup image 115 should be deleted after being stored for 180 days. In various embodiments, lifecycle policy information may be created and/or modified by a system administrator and/or a programmatic API.

In some embodiments, a copy of lifecycle policy information associated with a given backup image may be stored as part of the backup image itself, as described herein. As used herein, in some embodiments, the term "lifecycle policy information" refers to information corresponding to a backup image that provides, at a minimum, instructions for future handling the backup image—e.g., actions to perform on the backup image as time passes and/or other data lifecycle events occur. Various lifecycle events, such as the data reaching a given age, data being copied, data being replaced, a storage threshold of the storage system being reached, etc. are described in detail below, as are various actions that may be described by the policy information to be performed in response to detecting such storage lifecycle events. In some embodiments, the term "lifecycle policy information" may additionally include provenance information regarding the backup, as described below. In some embodiments, provenance information of a given backup image refers to information indicative of one or more historical lifecycle events that have occurred in the lifecycle of the backup image and/or lifecycle policy actions performed for that image. Such information is discussed in more detail below.

For example, in the illustrated embodiment, backup image 115 comprises lifecycle policy information 120. Thus, if backup image 115 is copied or moved to another backup system in a different domain (e.g., backup system 135 in receiving domain 130), lifecycle policy information 120 may be copied or moved along with it. In some embodiments, backup storage system 105 may be configured to create a secondary copy of backup image 115 by causing the image to be copied to backup storage system 135 in domain 130 over a network. In some embodiments, shared storage may be used to communicate a backup image from initiating domain 100 to receiving domain 130. For example, storage system 105 may copy backup image 115 to a storage location accessible to backup storage system 135. For example, the storage location may be provided as shared storage on a cloud computing platform.

The copy of backup image 115 is represented in backup storage system 135 by the dotted outline. As shown, when backup image 115 is copied or moved, the embedded copy of its associated lifecycle policy information 120 is also copied or moved along with the image. Thus, since lifecycle policy information 120 follows backup image 115, the policy may be effectively enforced across multiple, distinct domains, such as 100 and 130 of FIG. 1. (Note that in other embodiments, lifecycle policy information 120 may be separate from backup image 115, as described above.)

Figure 2:
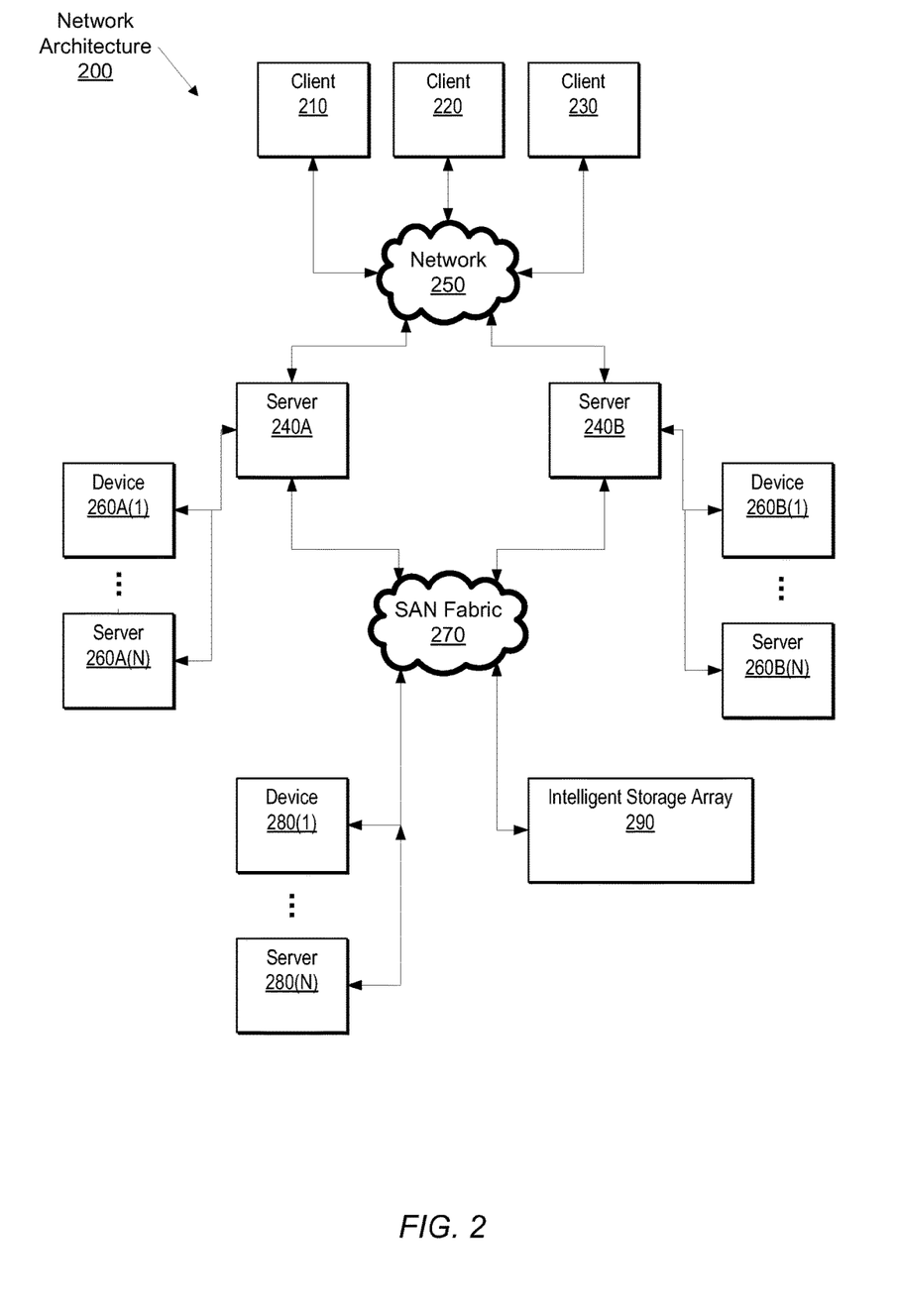
FIG. 2 is a block diagram illustrating one embodiment of a network architecture usable by one or more clients to store data with associated lifecycle policy information on a storage area network.

In some embodiments, a domain and/or backup system may be implemented using a network architecture, such as network architecture 200 in FIG. 2. FIG. 2 is a block diagram depicting a network architecture 200 in which client systems 210, 220 and 230, as well as storage servers 240A and 240B (any of which can be implemented using computer system 300 discussed below), are coupled to a network 250. Storage server 240A is further depicted as having storage devices 260A(1)-(N) directly attached, and storage server 240B is depicted with storage devices 260B(1)-(N) directly attached. Storage servers 240A and 240B are also connected to a SAN fabric 270, although connection to a storage area network is not required in all embodiments. In some embodiments, various other types of networks, such as Ethernet networks may be used in place of SAN fabric 270. In one embodiment, SAN fabric 270 supports access to storage devices 280(1)-(N) by storage servers 240A and 240B, and so by client systems 210, 220 and 230 via network 250. Intelligent storage array 290 is also shown as an example of a specific storage device accessible via SAN fabric 270. In various embodiments, various components or network architecture 200 may be implemented as part of a cloud computing platform.

As will be discussed with reference to FIG. 3, any suitable network hardware or interface may be used to provide connectivity from each of client computer systems 210, 220 and 230 to network 250. In various embodiments, client systems 210, 220 and 230 are able to access information on storage server 240A or 240B using, for example, a web browser or other client software (not shown). Such a client allows client systems 210, 220 and 230 to access data hosted by storage server 240A or 240B or one of storage devices 260A(1)-(N), 260B(1)-(N), 280(1)-(N) or intelligent storage array 290. FIG. 2 depicts the use of a network such as the Internet for exchanging data, but the present disclosure is not limited to the Internet or any particular network-based environment.

Figure 3:
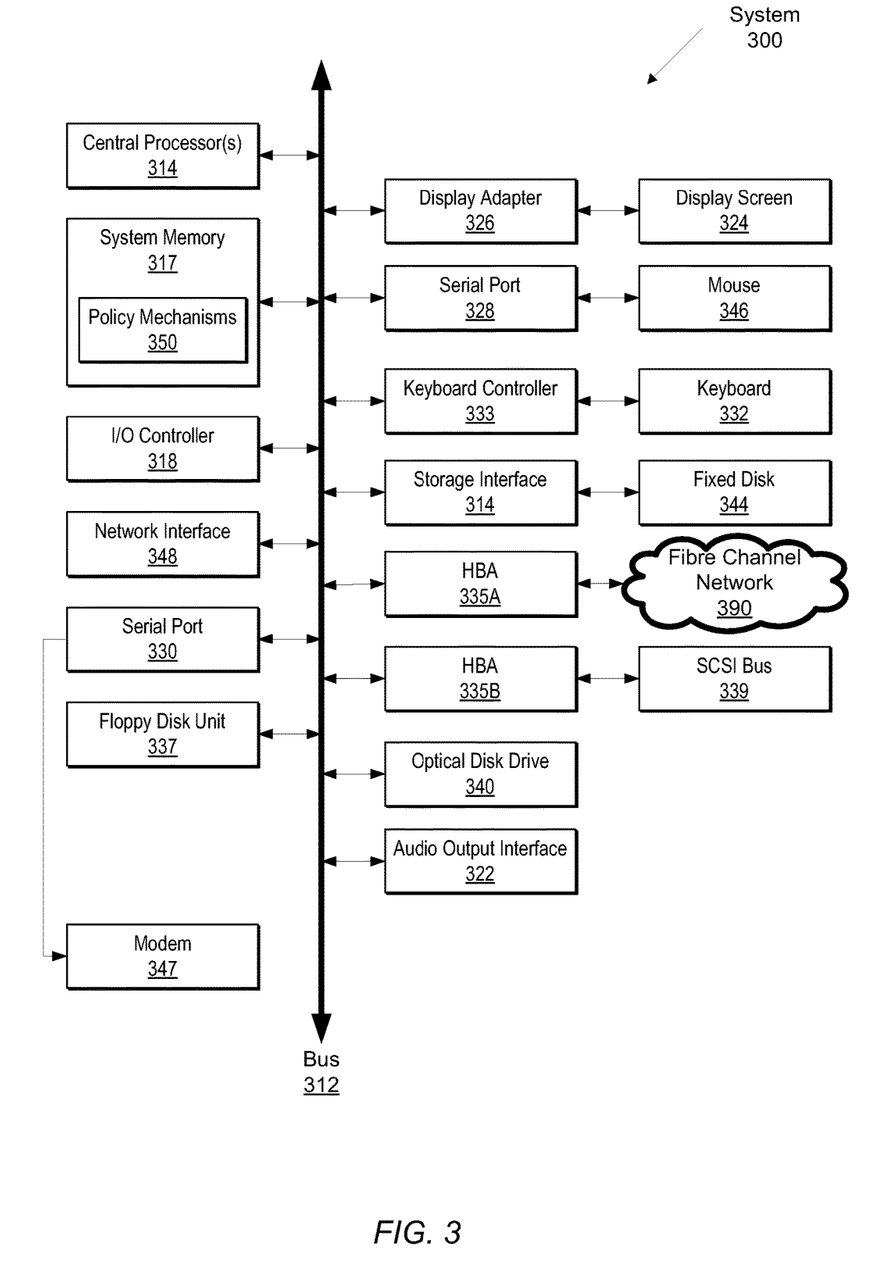
FIG. 3 is a block diagram illustrating one embodiment of a computer system configured to implement backup storage using backup images with embedded lifecycle policy information.

FIG. 3 depicts a block diagram of a computer system 300 suitable for implementing various aspects described in the present disclosure. Computer system 300 includes a bus 312 which interconnects major subsystems of computer system 300, such as a central processor 314, a system memory 317 (typically RAM, but which may also include ROM, flash RAM, or the like), an input/output controller 318, an external audio device, such as a speaker system 320 via an audio output interface 322, an external device, such as a display screen 324 via display adapter 326, serial ports 328 and 330, a keyboard 332 (interfaced with a keyboard controller 333), a storage interface 334, a floppy disk drive 337 operative to receive a floppy disk, a host bus adapter (HBA) interface card 335A operative to connect with a Fibre Channel network 390, a host bus adapter (HBA) interface card 335B operative to connect to a SCSI bus 339, and an optical disk drive 340 operative to receive an optical disk. Also included are a mouse 346 (or other point-and-click device, coupled to bus 312 via serial port 328), a modem 347 (coupled to bus 312 via serial port 330), and a network interface 348 (coupled directly to bus 312).

Bus 312 allows data communication between central processor 314 and system memory 317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 300 are generally stored on and accessed via a computer readable medium, such as a hard disk drive (e.g., fixed disk 344), an optical drive (e.g., optical drive 340), a floppy disk unit 337, or other storage medium. Additionally, applications can be in the form of electronic signals modulated in accordance with the application and data communication technology when accessed via network modem 347 or interface 348. System memory 317 may comprise program instructions to implement various techniques described below.

Storage interface 314, as with the other storage interfaces of computer system 300, can connect to a standard computer readable medium for storage and/or retrieval of information, such as a fixed disk drive 344. Fixed disk drive 344 may be a part of computer system 300 or may be separate and accessed through other interface systems. Modem 347 may provide a direct connection to a remote server via a telephone link or to the Internet via an internet service provider (ISP). Network interface 348 may provide a direct connection to a remote server via a direct network link to the Internet via a POP (point of presence). Network interface 348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 3 need not be present to practice the present disclosure. The devices and subsystems can be interconnected in different ways from that shown in FIG. 3. The operation of a computer system such as that shown in FIG. 3 is readily known in the art and is not discussed in detail in this application. Code to implement the present disclosure can be stored in computer-readable storage media such as one or more of system memory 317, fixed disk 344, optical disk, or floppy disk. The operating system provided on computer system 300 may be MS-DOS®, MS-WINDOWS®, OS/2®, UNIX®, Linux®, or another known or suitable operating system.

Moreover, regarding any signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 4:
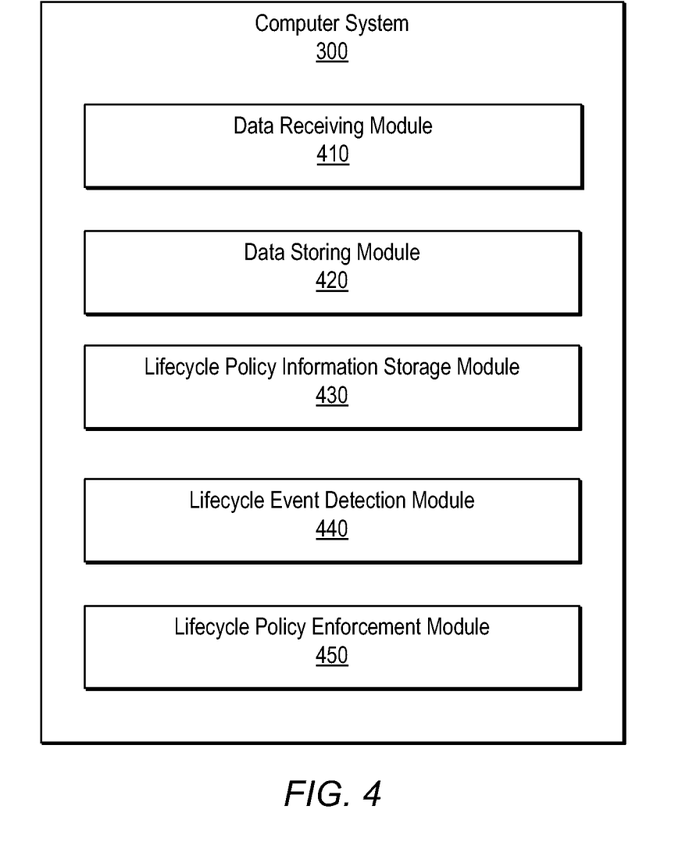
FIG. 4 is a block diagram illustrating one embodiment of a storage system having modules storing program instructions executable to receive backup data with associated lifecycle policy information.

FIG. 4 is a block diagram of various modules within computer system 300. The embodiment of FIG. 4 is only an example and in various embodiments more or fewer modules may be used. In addition, various modules may be implemented in hardware and/or software. For example, modules 410-450 may be implemented by program instructions stored by memory 317, such as in FIG. 3.

According to the embodiment of FIG. 4, computer system 300 may include a data receiving module 410, which may be configured to receive data (e.g, a backup image) for storage and a data storing module 420, which may be configured to store the data received by receiving module 410, such as in persistent storage. In various embodiments, storage module 420 may be configured to store the received data in any of the storage devices illustrated in FIG. 2 or 3, such as fixed disk 344 or intelligent storage array 290, etc. Still further, computer system 300 may include a lifecycle policy information storage module 430, which may perform storage of lifecycle policy information extracted from within a backup image received by module 410 in one embodiment.

According to the illustrated embodiment of FIG. 4, computer system 300 may include a data lifecycle event detection module 440 configured to detect lifecycle events, such as a given amount of time passing, a new backup image being received, the storage system reaching a storage capacity limit, or any other event that may require some action to be taken (e.g., performed on the backup image) as described in the lifecycle policy associated with the data. According to the illustrated embodiment, computer system 300 may also include a lifecycle policy enforcement module 450 configured to perform the actions described in the lifecycle policy information in response to a lifecycle event being detected, such as by lifecycle event detection module 440.

Figure 5:
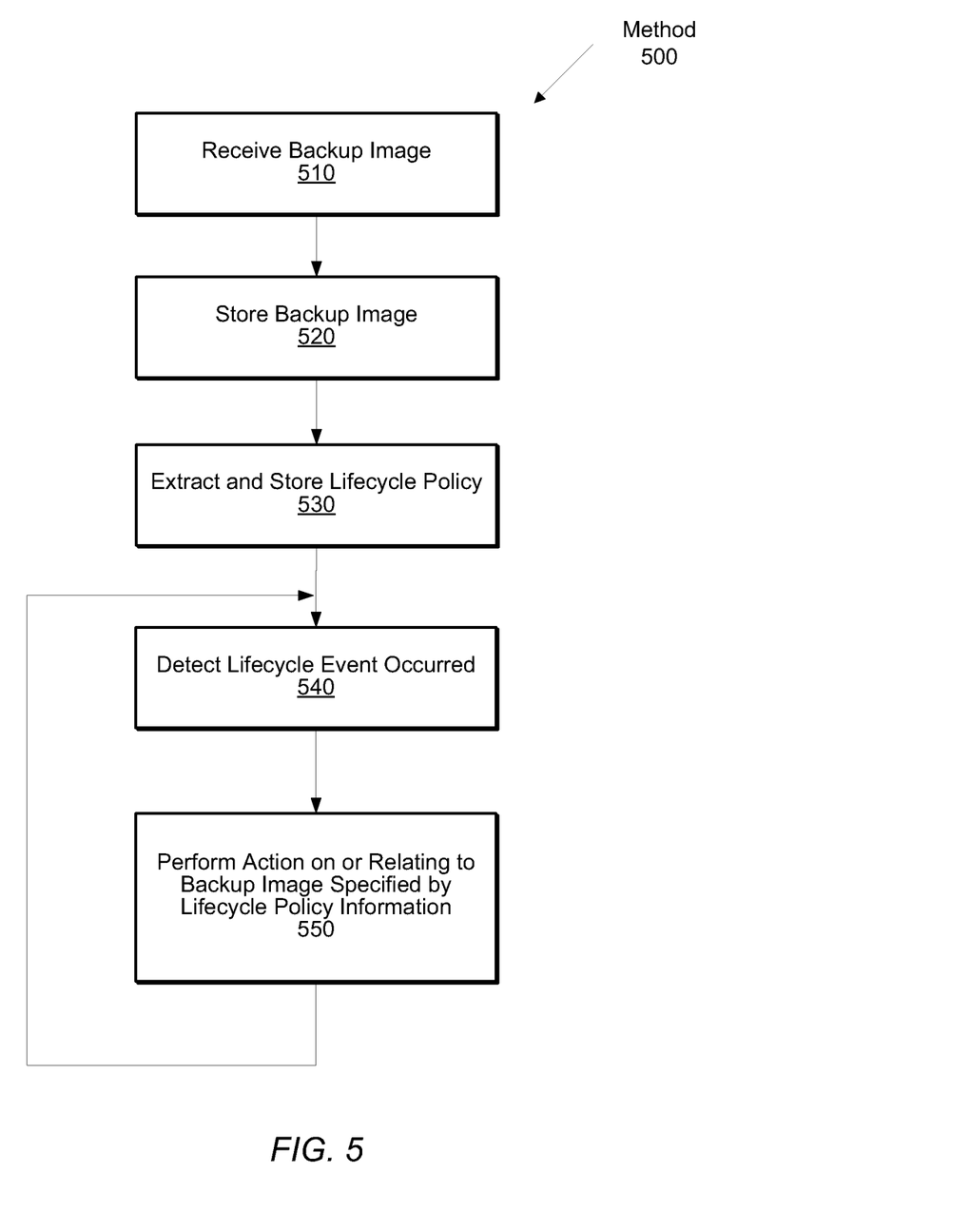
FIG. 5 is a flow diagram illustrating one embodiment of a method for importing a backup image containing lifecycle policy information into a backup storage system.

FIG. 5 illustrates one embodiment of a method 500 for handling a backup image that includes lifecycle policy information. For example, method 500 may be executed by a backup storage system, such as 135 in domain 130, in response to receiving a backup image, such as 115.

Method 500 may begin when a backup system receives a backup image, as in 500. In some embodiments, receiving the backup image, as in step 510, may be performed by a data receiving module, such as 410. In some embodiments, the backup system may receive the image over a network from a different backup system in a different domain, as shown in FIG. 1. However, many other possibilities exist for how the image is received by the system. For example, a system administrator may manually copy the image to a removable storage device (e.g., tape) at the originating site and physically ship the tape to the location of the receiving system. At the location of the receiving system, the image on the storage device may be copied to the local backup system in the receiving domain.

In method 500, the receiving backup system may store the backup image, as in step 520. In some embodiments, storing the backup image may be performed by a data storing module, such as 420 in FIG. 4. Storing the image may include copying the image to one or more persistent storage devices, such as disk drives, tape drives, etc. In some embodiments, storing the backup image, as in step 520, may also comprise creating some backup metadata associated with the image, such as entries in a local backup catalog. Such data may indicate where the image is stored, to whom it belongs, when it was received, and any other information relevant to the local backup system.

In method 500, the receiving backup system may then extract the lifecycle policy information from the received backup image and store it, as in step 530. In some embodiments, storing the lifecycle policy information may comprise copying the policy information or parts of the policy information to a policy database, such as backup catalog 140 in FIG. 1, and associating the policy with the received backup image. Step 530 may be performed by module 430 in one embodiment.

Thereafter, various policy enforcement mechanisms may enforce the lifecycle policy information associated with the backup image. As shown in method 500, whenever the storage system detects a lifecycle event, as in step 540, it may automatically perform some action on or relating to the backup image in response, as in step 550, as specified by the policy.

In some embodiments, detection of lifecycle events (as in step 540) and the performance of actions on or relating to the backup image according to the associated lifecycle policy information (as in step 550), may be performed by a lifecycle event detection module (e.g., 440) and a lifecycle policy enforcement module (e.g., 450) respectively. Various examples of lifecycle events may include a given amount of time passing, a new backup image being received, the storage system reaching a storage capacity limit, or any other event that may require action to be taken on the backup image, as described in the lifecycle policy information. More examples are described below.

Figure 6:
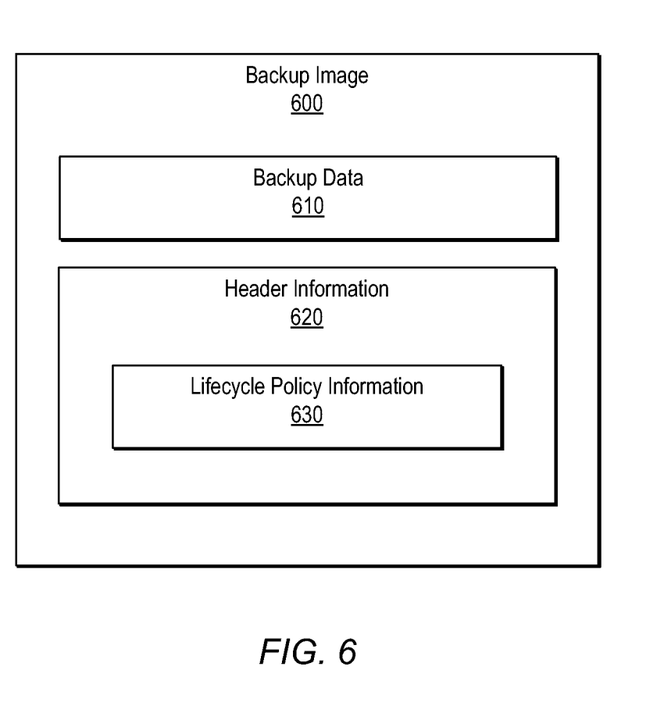
FIG. 6 is a block diagram illustrating one embodiment of a backup image containing lifecycle policy information.

FIG. 6 is a block diagram illustrating a backup image, according to one embodiment. In the illustrated embodiment, backup image 600 comprises backup data 610 and header information. (Backup image 600 is used as shorthand throughout the remainder of the disclosure to refer to any backup image according to the present disclosure, whether or not lifecycle policy information 630 is within header information 620.) As described above, backup data 610 may represent a copy of data being backed up—e.g., from some other location. For example, backup data 610 may contain multiple files and/or directories of valued information that an entity or organization wishes to preserve.

Header information 620 may comprise information usable to register backup data 610 with the backup system's catalog (e.g., backup catalog 140). For example, in some embodiments, header information 620 may include the number of files in backup data 610, the size of backup data 610, and/or an indication of a compression and/or encryption algorithm applied to backup data 610. In some embodiments, storing the backup image on the storage system (as in 105 of FIG. 1) may include extracting and/or parsing header information 620 and registering some or all of that information in the backup catalog.

In some embodiments, one or more aspects of a lifecycle policy that is to be applied to a backup image may be stored as part of the header information. For example, lifecycle policy information 630, which is to be applied to backup image 600, is stored as part of header information 620. In other embodiments, lifecycle policy information 630 may be stored in other parts of backup image 600. For example, in one embodiment, lifecycle policy information 630 may be stored as a separate fragment of backup image 600. In yet other embodiments, lifecycle policy information 630 may be stored as a separate file that is identifiable as associated with the target image. In some embodiments, any or all of backup data 610, header information 620, and lifecycle policy information 630 may be stored in separate files and combined into a single location as part of backup image 600.

In various embodiments, a lifecycle policy information may provide an indication of how the backup system should handle the image, such as what actions it should take in response to various lifecycle events. For example, lifecycle policy information 630 may specify a retention policy. Some examples of retention policies may include fixed retention (wherein the image may be retained for a fixed interval of time), capacity managed retention (wherein the image may be deleted dependent on the available storage capacity on the backup system), an expire after duplication policy (wherein the image may be deleted once it is duplicated, such as to tape), and/or any other suitable retention policies.

In some embodiments, lifecycle policy information 630 may specify a data replacement policy. For example, such a policy may specify that the data be retained until a client that owns the backup image sends a newer image. Such a policy may be generalized to indicate that the previous N images sent by the client should be kept. In another example, a data replacement policy may specify that rather than deleting the image when a newer image is received, the older image should be archived, such as by copying it to tape. Various other data replacement policies may be indicated by the lifecycle policy information 630 and triggered by various lifecycle events, such as receiving a new image from the same entity that backup data 610 originated from.

In some embodiments, lifecycle policy information 630 may specify a propagation policy. In such embodiments, a propagation policy may indicate whether, when, to where, and/or under what circumstances backup image 600 should be copied to another storage system. For example, a propagation policy specified by lifecycle policy information 630 may provide an indication of a specific storage site to which the image should be copied. In other examples, the propagation policy may specify that the image should be propagated to N storage systems and allow the storage system at the receiving domain to determine what particular N storage systems are to receive the backup image. In yet another example, the propagation policy may specify that the data should never be propagated. Various other data propagation policies may be indicated by lifecycle policy information 630 and triggered by various lifecycle events, such as receiving the image, receiving a new image, a given amount of time elapsing, etc.

Figure 7:
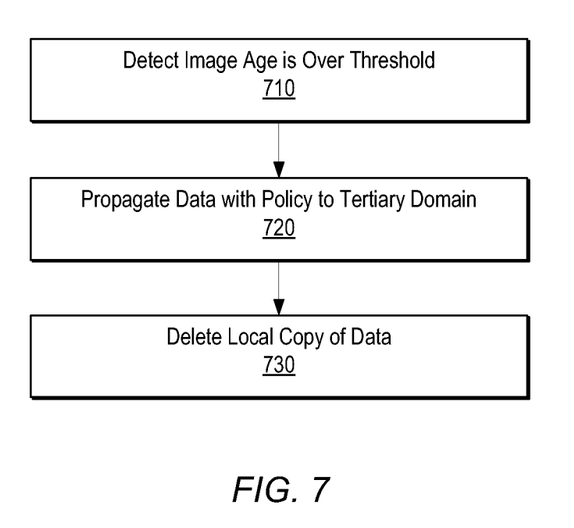
FIG. 7 is a flow diagram illustrating one embodiment of a method for enforcing a given backup image propagation policy.

FIG. 7 illustrates one example of enforcing a propagation policy according to lifecycle policy information 630. According to the illustrated embodiment, lifecycle policy information 630 may specify that after backup image 600 reaches a given age threshold, the storage system may detect such an event (as in step 710) and propagate the data with its associated policy information to another domain (as in step 720). According to the depicted embodiment, the policy may also specify that after propagation, the local copy should be deleted (as in step 730). Such a policy may be used, for example, to move older backup data from one storage device (e.g., disk) onto less accessible but less expensive storage (e.g., tape).

In some embodiments, lifecycle policy information 630 may specify a notification policy. In such embodiments, the notification policy may outline whether, when, how, and whom/what to notify when various lifecycle events occur. For example, in some embodiments, a notification may be sent in response to backup image 600 being initially imported into domain 130, when image 600 is archived, when image 600 is expired, when image 600 is deleted, and/or other lifecycle events.

In some embodiments, notifications may be sent in different manners and/or to different entities. For example, in one embodiment, a notification policy may specify that in response to detecting a given lifecycle event, a storage system (e.g., 135) should send a message (e.g., an email) indicative of the detected event to a given address (e.g., an email address). In such an embodiment, the notification policy may contain an indication of the address. In some embodiments, the notification policy may indicate that in response to detecting a given event, the storage system should notify a management application, which may be remote. In such an embodiment, the notification policy may contain an indication of an address (e.g., an IP address and/or port number) usable to contact the management application. In some embodiments, the notification policy may contain login credentials (e.g., username/password) usable by the notifying system to authenticate itself to the management application. In another embodiment, the notification policy may indicate that in response to a given lifecycle event, the storage system should notify the originating domain's controller (i.e., master server). In some embodiments, the originating domain's server may respond by updating metadata associated with the backup image.

In some embodiments, lifecycle policy information 630 may include custom tags associated with the image. In such embodiments, various custom lifecycle policies may be specified to the receiving backup system using custom tags. As used herein, a "custom tag" is information within lifecycle policy information 630 that specifies a particular level of service to be afforded to the associated backup image. For example, one backup image may be tagged with a "gold"

tag, while another image is tagged with a "silver" tag. At the receiving domain, images tagged as "gold" may be stored according to different lifecycle policies than those tagged as "silver". For example, in one embodiment, a backup system may implement a policy such that data tagged as "gold" is automatically duplicated to a tertiary storage site and kept for an extra 60 days while data tagged as "silver" is not replicated and is kept only for an extra 60 days.

In different embodiments, lifecycle policy information 630 may specify a variety of other information regarding the backup image. For example, the policy may contain some data provenance information, such as the name of the domain that created backup image 600, the date that the original image was captured, an identifier of the client who owns the data, an identifier of the storage unit that the image was originally stored on (e.g., in domain 100), and/or other information regarding the origins of the image. Still further, lifecycle policy information 630 may include information regarding prior backups of the set of data to which backup image 600 corresponds. For example, lifecycle policy information 630 may indicate that backup image 600 is a second backup of a particular set of data, and further indicate information regarding an initial backup of a particular set of data. Thus, in certain embodiments, lifecycle policy information 630 may include historical information (e.g., provenance information) regarding backup image 600, as well as information regarding future handling of image 600 (e.g., in domain 130).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    a first backup storage system within a receiving domain receiving a backup image from an originating domain distinct from the receiving domain, wherein the backup image includes backup data and corresponding lifecycle policy information specifying a lifecycle policy for the backup data, and wherein the lifecycle policy is enforced in the originating domain;
    the first backup storage system extracting the lifecycle policy information from the backup image; and
    the first backup storage system enforcing the lifecycle policy by detecting an occurrence of a lifecycle event and performing a corresponding operation relating to the backup data, wherein the operation is specified by the extracted lifecycle policy information.

2. The method of claim 1, wherein the receiving domain is a disaster recovery domain, wherein the backup data is generated by a second backup storage system within the originating domain, wherein the originating domain stores the lifecycle policy information in a backup catalog, wherein the originating domain embeds the backup image with the lifecycle policy information in the backup catalog, and wherein the backup catalog is not accessible from within the receiving domain.

3. The method of claim 1, wherein the lifecycle policy information is received by the receiving domain within a header located within the backup image, wherein the extracting includes storing the lifecycle policy within a backup catalog of the receiving domain.

4. The method of claim 1, wherein the backup data was created by a first backup operation of a set of data, and wherein the lifecycle policy information includes information pertaining to a second backup operation performed on the set of data prior in time to the first backup operation.

5. The method of claim 1, wherein the lifecycle policy information specifies a duration that the backup data is to be maintained by the receiving domain.

6. The method of claim 1, wherein the lifecycle policy information specifies that the backup data is to be propagated to a tertiary domain distinct from the originating and receiving domains.

7. The method of claim 6, wherein the lifecycle policy information includes information instructing the receiving domain to provide information to the tertiary domain that specifies one or more operations to be performed on the backup data by the tertiary domain.

8. The method of claim 1, wherein the lifecycle policy information includes a custom tag specifying a priority level for the backup data, and wherein a manner in which said operation is performed is based, at least in part, on a value of said custom tag.

9. The method of claim 1, wherein the lifecycle policy information includes information specifying a notification condition and an entity, wherein said detecting includes automatically determining that the notification condition is satisfied, and wherein said performing includes, in response to said determining, automatically notifying the entity that the notification condition has been satisfied.

10. The method of claim 9, wherein the entity is associated with the originating domain.

11. An article of manufacture including a computer-readable medium having instructions stored thereon that, if executed by a backup storage system within a first domain, cause the backup storage system to perform a method comprising:
    receiving information from a second domain distinct from the first domain, wherein the information includes a backup image that includes backup data and corresponding lifecycle policy information specifying a lifecycle policy for the backup image, wherein the lifecycle policy is enforced in the second domain;
    extracting the lifecycle policy information from the backup image; and
    enforcing the lifecycle policy by detecting an occurrence of a lifecycle event and performing a corresponding operation on the backup image, wherein the operation is specified by the extracted lifecycle policy information.

12. The article of manufacture of claim 11, wherein the lifecycle policy information includes an identification of the second domain.

13. The article of manufacture of claim 11, wherein the lifecycle policy information specifies a replacement policy for the backup image within the first domain.

14. The article of manufacture of claim 11, the method further comprising automatically sending a message outside the first domain, wherein the message includes information indicating a status of the operation on the backup image.

15. The article of manufacture of claim 11, wherein the lifecycle policy information includes provenance information pertaining to the backup image and further includes information specifying a retention policy for the backup image within the first domain.

16. The article of manufacture of claim 11, wherein the operation includes moving the backup image to a different backup storage system.

17. A system comprising:
a storage system located in a first domain, wherein the storage system includes at least one storage device;
one or more processors;
a memory storing program instructions executable by the one or more processors to:
receive information from a second domain distinct from the first domain, wherein the received information includes a backup image, wherein the backup image includes backup data and corresponding lifecycle policy information specifying a lifecycle policy enforced in the second domain;
extract the lifecycle policy information from the backup image; and
enforce the lifecycle policy by detecting an occurrence of a lifecycle event and causing a corresponding operation to be performed on the backup image, wherein the operation is specified by the extracted lifecycle policy information.

18. The system of claim 17, wherein the lifecycle information includes provenance information for the backup image, and wherein the system is unable to access a catalog for the backup image in the second domain, wherein the backup image includes lifecycle policy information from the catalog.

19. The system of claim 17, wherein the lifecycle policy information specifies a condition under which the backup image is to be deleted, and wherein the program instructions are executable to automatically cause the storage system to perform the operation based at least in part on automatically detecting the specified condition.

20. The system of claim 17, wherein the lifecycle policy information includes information relating to one or more previous backups of a set of data, and wherein the lifecycle policy information includes information specifying future handling of the backup image within the first domain.

* * * * *